United States Patent [19]
Chisholm et al.

[11] Patent Number: 6,115,764
[45] Date of Patent: Sep. 5, 2000

[54] ACYCLIC CABLE BUS HAVING REDUNDANT PATH ACCESS

[75] Inventors: Douglas Roderick Chisholm, Delray Beach; Andrew Boyce McNeill, Jr., Deerfield Beach, both of Fla.

[73] Assignee: International Business Machines Corporation, Armonk, N.Y.

[21] Appl. No.: 08/312,854

[22] Filed: Sep. 27, 1994

[51] Int. Cl.[7] .................................................. G06F 13/00
[52] U.S. Cl. ........................ 710/100; 709/238; 709/243; 370/282; 370/419
[58] Field of Search ..................... 395/200.15; 370/24, 370/105.3, 282, 419; 326/63; 709/243, 238

[56] References Cited

U.S. PATENT DOCUMENTS

| | | | |
|---|---|---|---|
| 5,325,355 | 6/1994 | Oprescu et al. | 370/24 |
| 5,347,450 | 9/1994 | Nugent | 395/200.15 |
| 5,384,769 | 1/1995 | Oprescu et al. | 370/24 |
| 5,384,808 | 1/1995 | Van Brunt et al. | 370/24 |
| 5,394,556 | 2/1995 | Oprescu | 395/800 |
| 5,400,340 | 3/1995 | Hillman et al. | 370/105.3 |
| 5,424,657 | 6/1995 | Van Brunt et al. | 326/63 |

OTHER PUBLICATIONS

"IEEE Standard for a High Performance Serial Bus", The Institute Of Electrical And Electronic Engineers, Inc., Draft 7.1v1, IEEEP1394, Aug. 5, 1994.

Marazas, et al., "Information Technology—SCSI–3 Serial Bus Protocol (SBP)", X3T10 992D, Rev. 18, Working Draft, Aug. 11, 1994.

*Primary Examiner*—Ayaz R. Sheikh
*Assistant Examiner*—Rupal D. Dharia
*Attorney, Agent, or Firm*—Andrew Dillon

[57] ABSTRACT

A novel PHY concentrator design is disclosed. The PHY concentrator provides switchable dual paths to disk drives from dual controllers. The concentrator uses a common input that is shifted into an internal shift register during the bus reset state and uses an individual TpBias source for each TPA port connection, instead of a common one for all ports. An external shift register can be loaded with an odd/even pattern or a half-on/half-off pattern, which controls the individual TpBias source for each TPA port. The concentrator prevents closed loop conditions from occurring when a pair of concentrators are used to build an array of devices, such as a RAID structure.

5 Claims, 4 Drawing Sheets

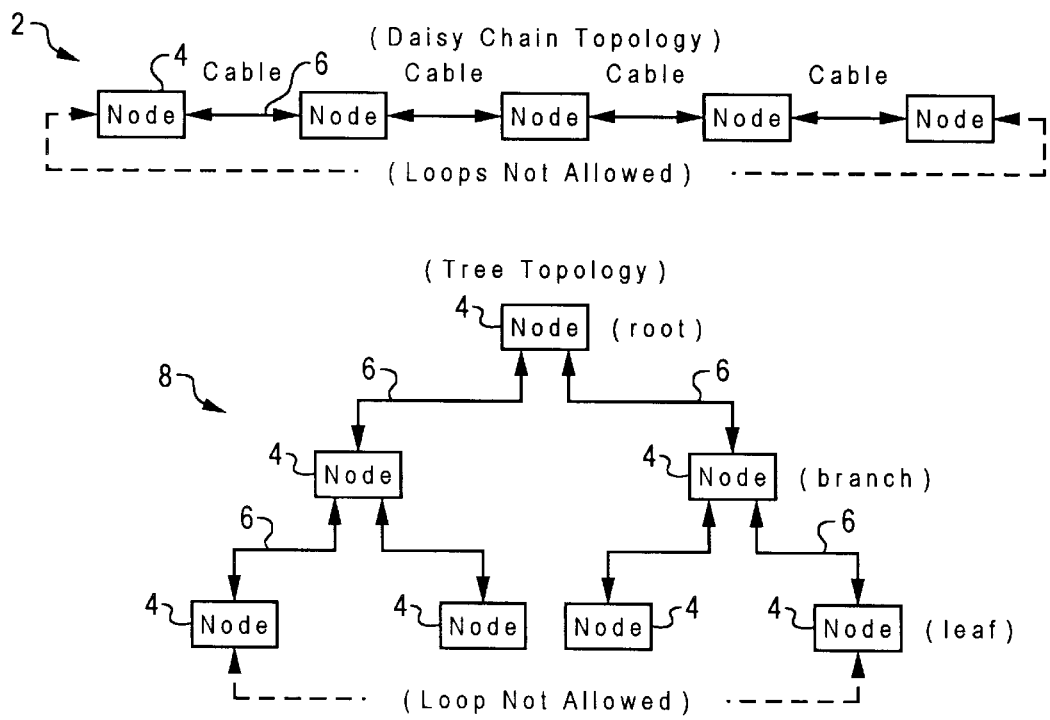
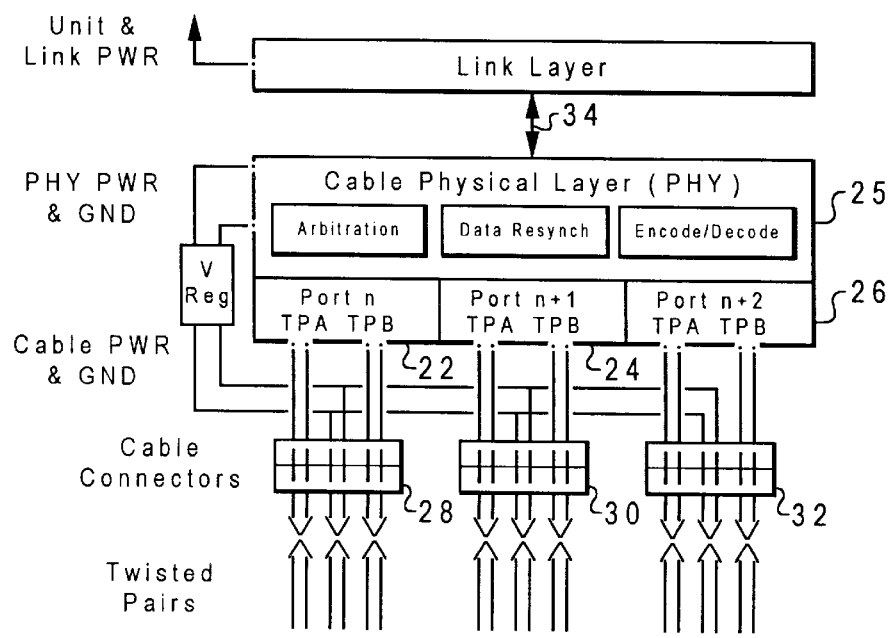
Fig. 1
Prior Art
Fig. 2
Prior Art

ACYCLIC CABLE BUS HAVING REDUNDANT PATH ACCESS

CROSS-REFERENCE TO RELATED APPLICATION

The present application is related to U.S. patent application Ser. No. 08/313,680, filed Sep. 27, 1994, entitled "Method and System For Matching Packet Size For Efficient Transmission Over a Serial Bus"; U.S. patent application Ser. No. 08/313,679, filed Sep. 27, 1994, entitled "Method For Generating Topology Map For A Serial Bus"; U.S. patent application Ser. No. 08/313,483, filed Sep. 27, 1994, entitled "Method For Selecting Transmission Speeds For Transmitting Data Packets Over A Serial Bus"; U.S. patent application Ser. No. 08/312,746, filed Sep. 27, 1994, entitled "Method And System For Determining Maximum Cable Segments Between All Possible Node to Node Paths On A Serial Bus"; patent application Ser. No. 08/313,490, filed Sep. 27, 1994, entitled "Method And System For Automatically Generating A Read Response Packet With Speed Matching Over A Serial Bus"; U.S. patent application Ser. No. 08/313,638, filed Sep. 27, 1994, entitled "Method And System For Dynamically Appending Data To Data Structures For Transmission Over A Serial Bus"; and all filed of even date herewith by the inventors hereof and assigned to the assignee herein, and incorporated by reference herein.

BACKGROUND OF THE INVENTION

1. Technical Field

This invention relates, generally, to a high performance serial cable bus, and, more specifically, to a high performance serial cable bus having topologies consisting of daisy chains or tree structures of cable hops, or a combination of both, but limited in an acyclic manner yet providing redundant path access to devices within the bus topology. More particularly still, the present invention relates to a high performance serial cable bus having automatic acyclic configuration devices in star configuration with dual controllers, and a means for switching devices from one controller domain to the other controller domain during a failure mode.

2. Description of the Related Art

Recently, the IEEE has established a High Performance Serial Bus according to Standard P1394 (hereafter referred to as P1394). The P1394 standard operates at speeds compatible with devices sending and receiving data at 100 megabits, 200 megabits, and 400 megabits per second, depending upon a particular device. Up to 63 devices are connectable as a single system on the P1394 bus. The P1394 requires that the bus structure follow a particular cable physical layer specification and cable bus topology and management services. Two types of topologies allowed under P1394 include the daisy chaining of cable hops or tree structures of cable hops, or a combination of both. FIG. 1 illustrates both a daisy chain topology and a tree topology, wherein the tree topology further illustrates subtopologies following the daisy chain topology. In the daisy chain topology nodes are connected on a peer to peer relationship, but only in an acyclic manner. Likewise, the tree topology is also acyclic, but provides for a client server or root and branch hierarchy.

The P1394 standard requires that the nodes have three stacked serial bus protocol layers: (1) the transaction layer, (2) the link layer, and (3) the physical layer. A P1394 link node has a unique physical ID (address), which is established during the initialization phases following a serial bus reset. The architecture layer that supports the initialization phases is the physical layer. In the cable topologies, this is referred to as the cable physical layer, to distinguish it from the backplane physical layer.

An example of a cable physical layer is illustrated in FIG. 2 and is hereinafter referred to as "PHY". PHY 25 must support the P1394 initialization phases, which include reset, tree-ID, and self-ID, in order for the bus to become initialized with each node having a unique physical ID, root assignment to one of the PHYs, and determining port connection status in a hierarchical structure pointing towards the root. The P1394 standard further defines a set of state machines that are implemented in PHYs to allow bus initialization to occur, but only if there are no loops in the cable topology. If there is a loop, a bus initialization timeout occurs, thus causing an error signal that can provide an error message warning of this event. The cable loop must then be "broken" and the serial bus must be reset again to start initialization.

Within PHY 25 are three PHY ports 22, 24, and 26. Each PHY port 22, 24, and 26 supports three external cable connector interfaces 28, 30, and 32, respectively, as well as an internal link to PHY interface 34. A PHY port 22, 24, and 26, also known as a serial cable interface, has low voltage differential drivers and receivers for two pair of signals TPA/TPA# and TPB/TPB#. These signals are propagated on pairs of twisted conductors in the cable that are used for DC signalling during bus initialization and arbitration phases, and for data/strobe encoded packet transmission and reception once the bus has been initialized. There is also a third twisted pair of conductors in the cable, which supplies unregulated PHY power and ground. This power pair allows PHY 25 to be powered from the cable, separate from the link power or unit power, so that the bus can be initialized even through a unit may be powered down.

An example of the two signal twisted pairs is illustrated in FIG. 3. Twisted pairs TPA (TPA/TPA#) and TPB (TPB/TPB#) are not only twisted in the cable (not shown), they are also crossed over in the cable so that TPA signals on one end of the cable become TPB signals on the other end, and vice versa. Also, the common mode voltage for the differential pair signalling is supplied from only one end of the cable for each cross over (TPA to TPB) twisted pair connection. Twisted pair bias (TpBias) is generated on each TPA connection and provides the common mode input voltage to the TPB circuit at the other end of the cable. This is important, because it allows each port to have a Port_Status comparator on its TPB cable connectors to sense the presence of TpBias from the TPA connectors at the other end of the cable, thus determining whether or not a port connection exists.

Although FIG. 2 shows a three-port PHY, PHY implementations under P1394 may support many more ports, up to 27. This limitation is due to the self-ID packet format that P1394 defines. PHYs broadcast their self-ID packets during bus initialization to convey their physical ID, the number and state of the ports they support, and other configuration data.

The P1394 cable topologies form a repeater bus. After the initialization phases are complete, all PHYs have a physical ID, and a root node is established. A data packet transmitted from one node is propagated and repeated through all PHY ports (internal and external) throughout the bus. There is no packet routing based on node addresses; all nodes receive the data packet and it is up to their respective link layers to determine if the data packet is for that particular PHY or node, and whether it should acknowledge receipt of the data packet. Therefore, if a cable or PHY is or should become disconnected, it breaks the repeater path between nodes up stream and down stream from it. Consequently, there are PHY concentrators under P1394.

A PHY concentrator is a PHY having multiple ports, for example, at least 10. The number of ports supported is based on the physical constraints for packaging and other cost tradeoffs. The PHY concentrator allows for star or point-to-point connections for multiple nodes, and allows for removal of defective devices without breaking the packet repeater path or requiring recabling. PHY concentrators are particularly desirable in file server environments.

A block diagram of a PHY concentrator is depicted in FIG. 4. Initiator node 52 serves as a serial SCSI RAID adapter and is coupled to a PHY concentrator 50. PHY concentrator 50 is further connected to a plurality of discrete PHYs 54, each of which is further connected to a target node disk drive 56, which make up the RAID arrangement. (RAID stands for redundant array of inexpensive disks.) Any target node disk drive 56 can be disconnected without "breaking" the bus because of the point-to-point distribution allowed by the PHY concentrator 50. P1394 also supports hot plugging, so in a file server, especially with RAID support, the disk drives can be mounted in sliding drawers within an enclosure. Then, faulty disk drives can be removed and eventually replaced while the file system continues to run in a degraded mode.

In file server systems having high availability, it is desirable to maintain operation, albeit in a degraded mode, with any single point of failure. RAID systems have been developed as a solution to this problem. RAID-5 provides striping of data and parity across an array of disk drives so that when one drive fails, the data on the defective drive can be reconstructed with no loss of data. For higher availability, it is desirable to have the type of configuration shown in FIG. 5 in order to provide alternate paths to the disk drives and continued operation even when a controller fails. In FIG. 5, each hard disk drive is coupled to a first initiator node controller and a second initiator node controller, or PHY concentrator 50. Unfortunately, this arrangement would fail because each P1394 PHY must act as a repeater to all connected ports, and in this physical configuration, the interconnection between the PHY ports creates topology loops. In this arrangement, the bus would never pass the initialization phase.

Accordingly, what is needed is a way to provide redundant path access in an otherwise acyclic serial bus topology. Furthermore, the redundant path access must also be capable of allowing hot plug replacement of any component in the redundant path access.

SUMMARY OF THE INVENTION

It is therefore one object of the present invention to provide a high performance serial cable bus.

It is another object of the present invention to provide a high performance serial cable bus having topologies consisting of daisy chains or tree structures of cable hops, or a combination of both, but limited in an acyclic manner yet providing redundant path access to devices within the bus topology.

It is yet another object of the present invention to provide a high performance serial cable bus having automatic acyclic configuration of devices in a star configuration with dual controllers, and a means for switching devices from one controller domain to the other controller domain during a failure mode.

The foregoing objects are achieved as is now described. According to the present invention, a novel PHY concentrator design is disclosed. The PHY concentrator provides a switchable dual path to disk drives from dual controllers. The concentrator uses a common input that is shifted into an internal shift register during the bus reset state and uses an individual TpBias source for each TPA port connection, instead of a common one for all ports. An external shift register can be loaded with an odd/even pattern or a half-on/half-off pattern, which controls the individual TpBias source for each TPA port. The concentrator prevents closed loop conditions from occurring when a pair of concentrators are used to build an array of devices, such as a RAID structure.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 depicts two types of serial busses having either a daisy chain topology or a tree topology;

FIG. 2 depicts a block diagram of a physical or PHY port having three connectors;

DETAILED DESCRIPTION OF PREFERRED EMBODIMENT

Figure 3:
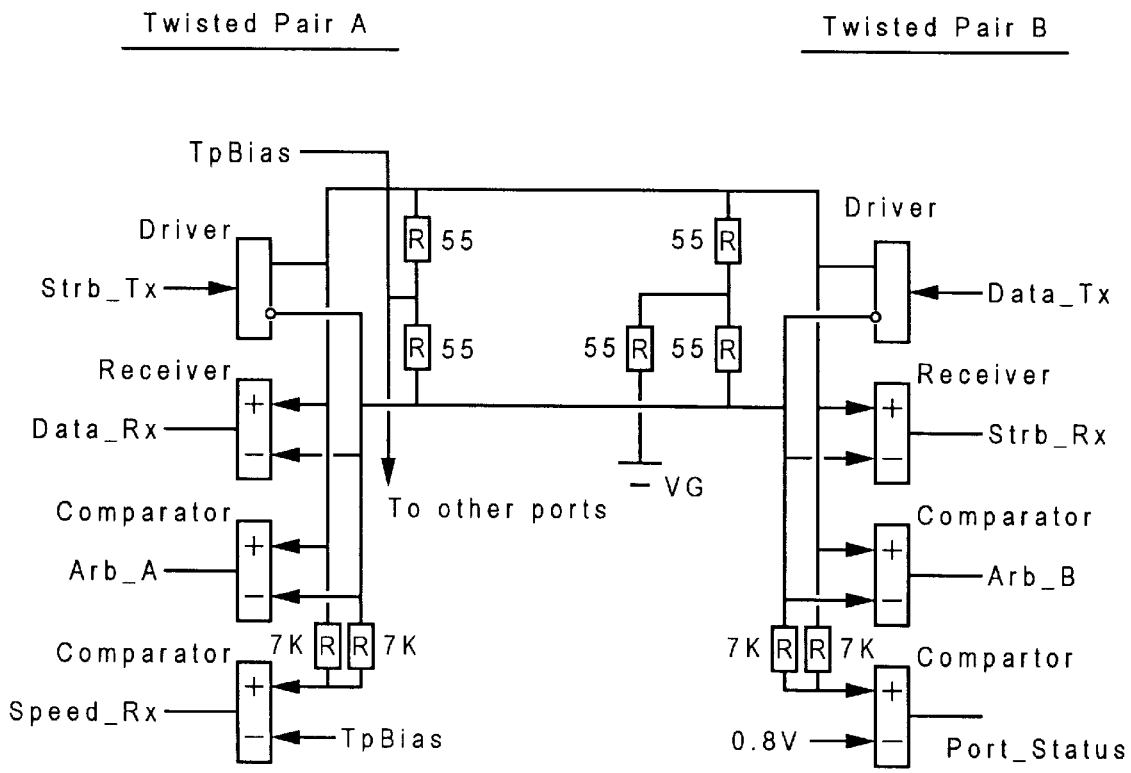
FIG. 3 depicts a logic view of a pair of signal twisted pair conductors and driver/receiver circuitry for any of the three connectors illustrated in FIG. 2.
Figure 4:
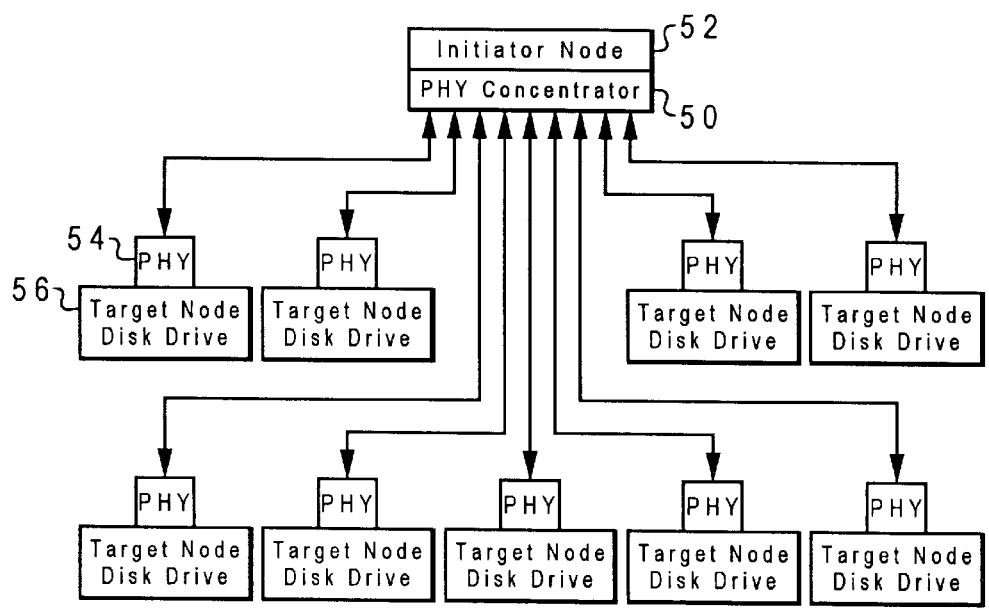
FIG. 4 is a block diagram of a PHY concentrator connecting a plurality of target nodes.
Figure 5:
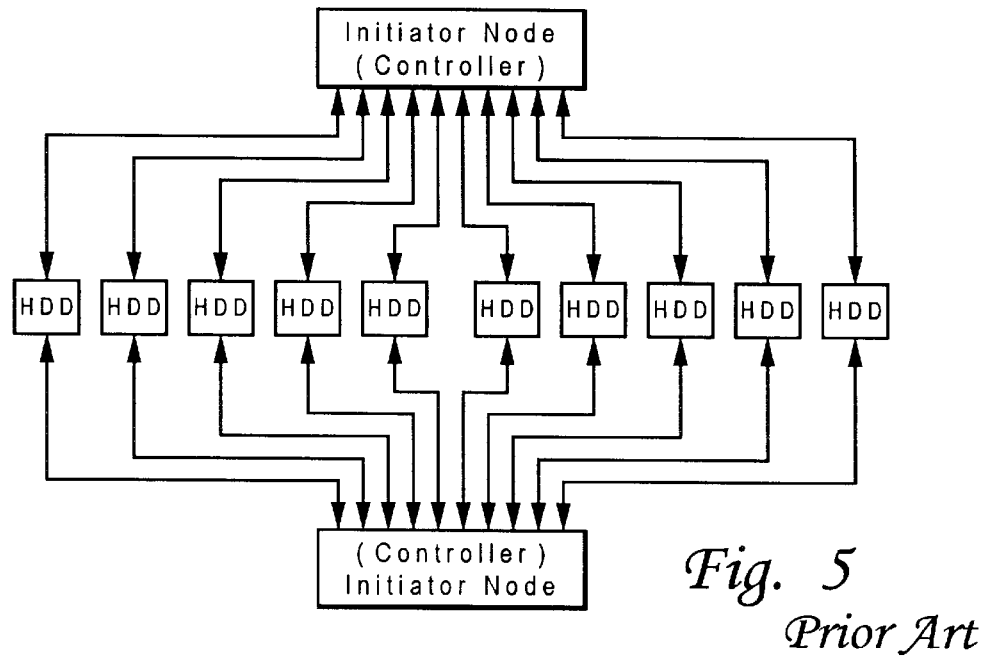
FIG. 5 is a diagram of a pair of PHY concentrators forming a loop path.
Figure 6:
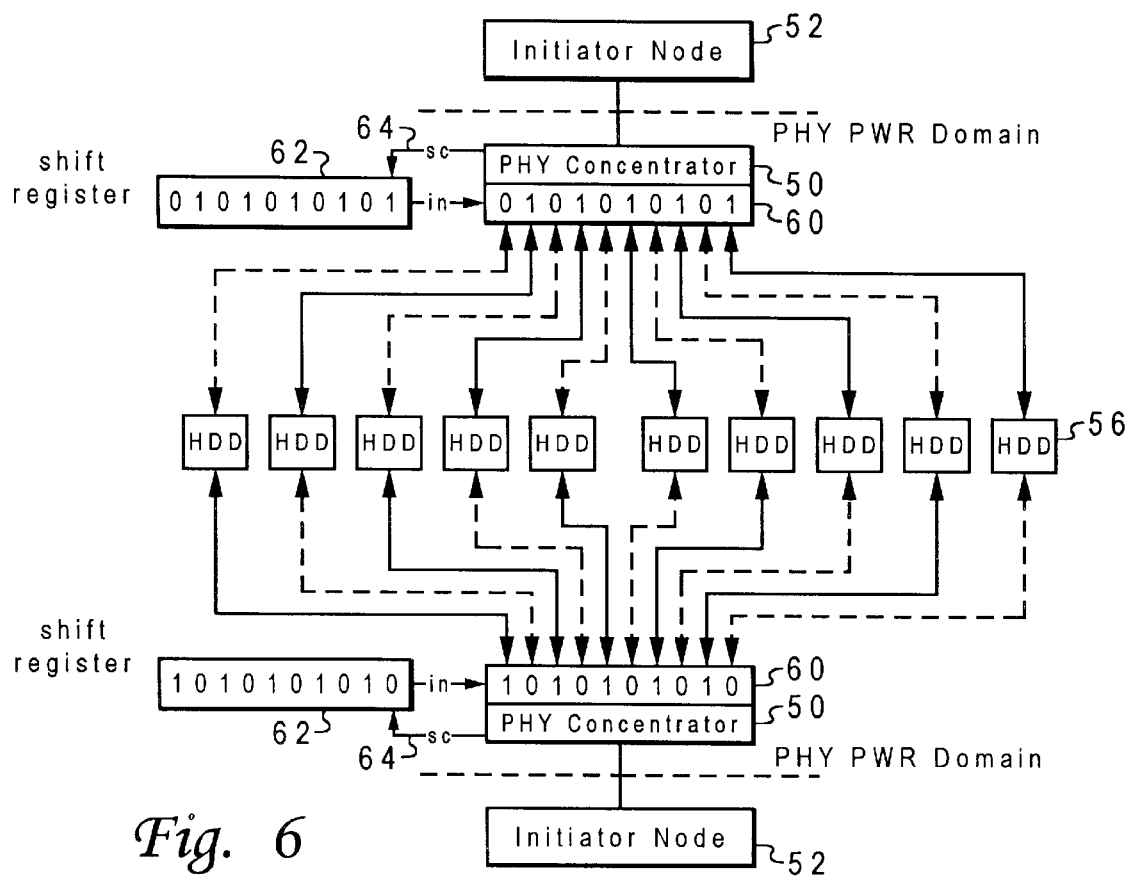
FIG. 6 depicts a block diagram of a redundant path access system having dual controllers according to the present invention.

A novel PHY concentrator design is depicted in the logic view of FIG. 6. The PHY concentrator design therein illustrates a switchable dual path to disk drives from dual controllers. A pair of PHY concentrators 50 each connected to an initiator node controller 52. PHY concentrators 50 have two additional functions. First, each has a common input that is shifted into an internal shift register 60 during bus reset state, and each has an individual TpBias source for each TPA port connection, instead of a common one for all ports. External shift registers 62 can be loaded with an odd/even pattern or a half-on/half-off pattern, which controls the individual TpBias source for each TPA port.

For high availability systems, loading of the external shift registers 62, (either parallel load or serial shift in) may be controlled through an alternate path to the controllers 52. This could be a serial port on the controller, possibly controlled through JTAG boundary scan signals. Once the external shift registers 62 are loaded with the desired patterns, a P1394 bus reset can be generated and the PHY concentrators 50 then shift the patterns in with shift clocks 64.

The patterns that are shifted into the PHY concentrators 50 must be opposite from one another so that TpBias is supplied to only one of the common disk drive's PHY ports. This allows the common disk drives 56 to initialize with only one of their ports logically connected, thus maintaining an acyclic star configuration. The dashed lines between PHY concentrators 50 and HDDs 56 represent physical cable connections with TpBias turned off. This results in one of the ports in each of the HDDs 56 being logically disconnected.

The shift patterns for PHY concentrators' 50 TpBias gating can be any pattern so long as they do not create any loops. If one of the controllers shown in FIG. 6 should become defective, a pattern of all zeros can be shifted into its PHY concentrator 50, and a pattern of all ones can be shifted into the other PHY concentrator. This places all of the HDD devices 56 under the control of the operational controller. If PHY power is lost in one controller, it automatically removes TpBias from all of its physically connected ports, and the operational controller then activates TpBias to all of its physically connected ports by having an all ones pattern shifted in.

The PHY concentrators of FIG. 6 can also operate in a single controller system, which system would not implement the external shift register and its support logic. Instead, the shift-in signals on the PHY concentrator would be tied to a logic 1 value. During the reset phase, the single controller PHY concentrator shifts in a pattern of all ones, thus enabling all of its ports.

Figure 7:
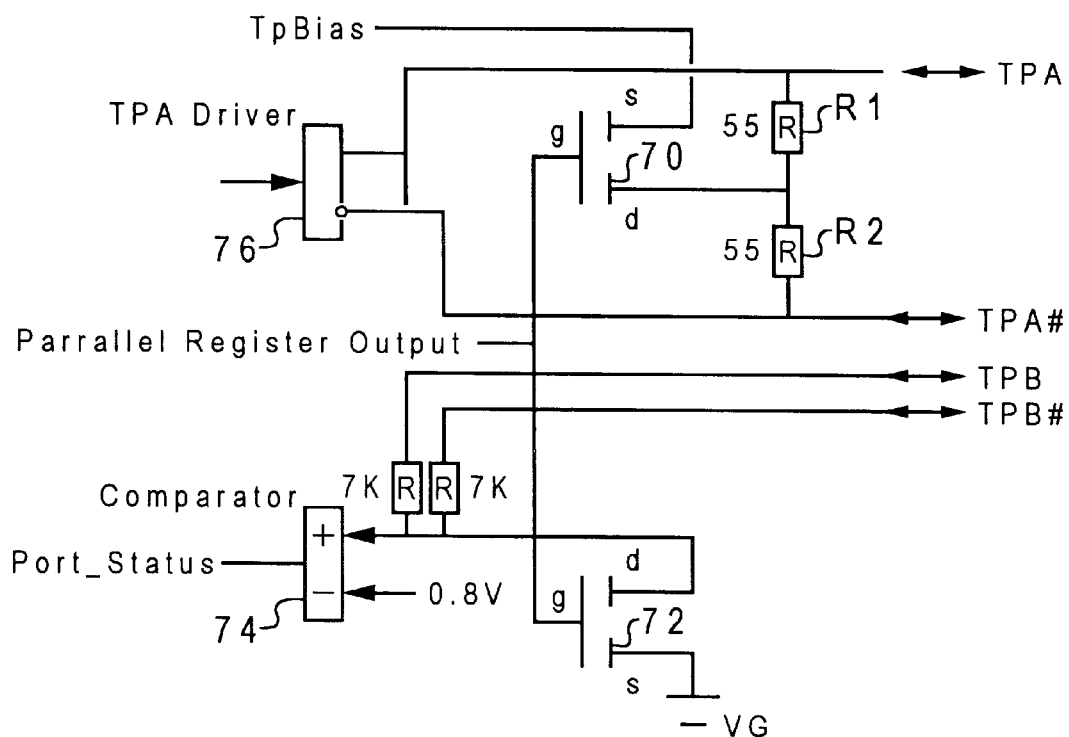
FIG. 7 is a schematic design of an alternative embodiment for use with the PHY concentrators of FIG. 6.

If, for some reason, the PHY concentrator being used did not implement the addition of an internal shift register, an external register with parallel outputs may be added. The register would then be loaded with the same pattern as described for the external shift register, but it must have a parallel output for each bit in the pattern. The parallel outputs can then be used to enable a MOSFET device, as illustrated in FIG. 7, that switches the TpBias on or off to each of the TPA common mode points, depending on the pattern of one and zeros loaded into the register. It would also be useful, depending on the design of the PHY, to force a disconnect signal at the port status comparator input for the logically disconnected ports. In FIG. 7, the parallel register output is controlled by MOSFETs 70 and 72. MOSFET 70 is further connected to TpBias and TPA. The second MOSFET 72 is connected to the comparator 74 and ground. The comparator is further connected to TPB and TPB# while TPA is further connected to TPA driver 76, which in turn is connected to TPA#. TPA# is further connected to TPA through resistors R1 and R2. Comparator 74 is further connected to port_status.

Thus it has been demonstrated that a serial bus configuration may be provided for providing redundant access in the automatic acyclic configuration of IEEE 1394 devices in star configurations with dual controllers. Furthermore, it has been shown that a means may be provided for switching devices from one controller domain to the other controller domain during a failure mode.

While the invention has been particularly shown and described with reference to a preferred embodiment, it will be understood by those skilled in the art that various changes in form and detail may be made therein without departing from the spirit and scope of the invention.

What is claimed is:

1. In a high speed acyclic serial bus having a plurality of devices, each device having a plurality of communication ports, a system for providing redundant access to said devices comprising:

a first concentrator having a plurality of ports, one of said ports being connected to a first communications port of said plurality of communication ports on each of said plurality of devices;

a second concentrator having a second plurality of ports, one of said ports of said second plurality of ports being connected to a second communications port of said plurality of communication ports on each of said plurality of devices;

first means for enabling a portion of said first plurality of ports for accessing a corresponding portion of said plurality of devices through said first concentrator; and second means for enabling a second portion of said plurality of ports through said second concentrator for accessing a second portion of said plurality of devices not accessed by said first concentrator;

and further comprising complementary first and second signals, said first signal being used to activate said first enabling means and said complementary second signal being used to activate said second enabling means such that each of said plurality of devices is only accessed by one concentrator.

2. The invention according to claim 1 wherein each of said plurality of communication ports further comprises:

a first communications receiver for receiving an input signal from another communications port;

a first communications driver for sending an output signal to said another communications port;

a port comparator that compares the signal on said first communications receiver to a reference signal so as to determine whether said communications port is connected to another communications port.

3. The invention according to claim 2 wherein each said port of said concentrators further comprises:

an output signal source for connecting to said first communications receiver;

an input signal source for connecting to said port comparator so that said port comparator can detect when a port of one of said concentrators is active.

4. The invention according to claim 1 wherein each of said enabling means in said concentrators further comprises a shift register for loading a preselected pattern for activating a pattern of said plurality of devices in such a manner that no closed serial bus loops are formed.

5. The invention according to claim 1 wherein said acyclic serial bus conforms to the P1394 Standard.

* * * * *